April 20, 1937.  E. RIETSCH  2,078,161

GEARING

Filed March 7, 1935

Inventor:
Eberhard Rietsch,
by Harry E. Dunham
His Attorney.

Patented Apr. 20, 1937

2,078,161

UNITED STATES PATENT OFFICE 2,078,161

GEARING

Eberhard Rietsch, Hennigsdorf, near Berlin, Germany, assignor to General Electric Company, a corporation of New York Application March 7, 1935, Serial No. 9,892
In Germany March 21, 1934

3 Claims. (Cl. 74—297)

My invention relates to gearing particularly suited for use in apparatus for automatically performing arc welding operations.

It is an object of my invention to provide improved means for rotating and simultaneously feeding an article such as a welding electrode.

Figure 1:
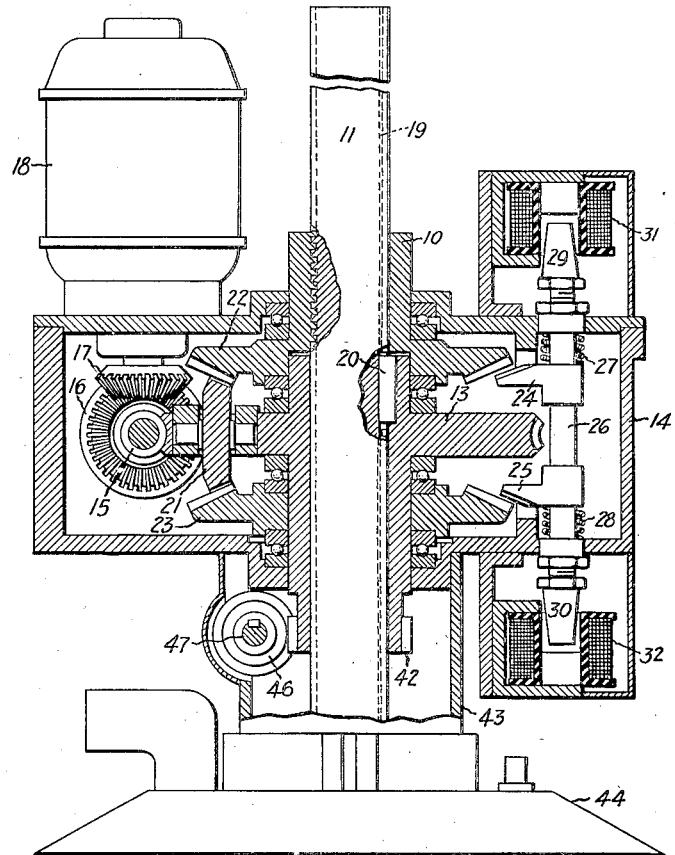
Figure 4:
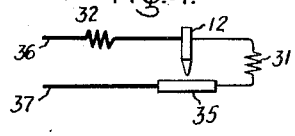
Figure 3:
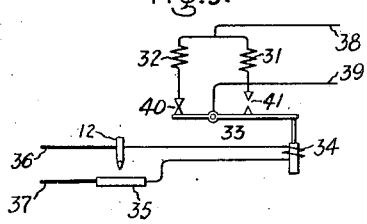
Figure 2:
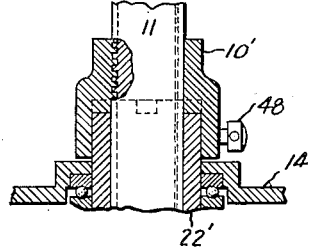

Further objects of my invention will become apparent from a consideration of the following description taken in connection with the accompanying drawing in which Fig. 1 represents one embodiment thereof; Fig. 2 illustrates a modification of the construction illustrated in Fig. 1, and Figs. 3 and 4 are circuit diagrams illustrating the connection of the operating coils of Fig. 1 rendering them responsive to characteristics of the welding circuit.

The apparatus illustrated in Fig. 1 comprises an internal screw 10 threaded upon an external screw 11 to the lower end of which is attached an electrode 12. The screws 10 and 11 are in reality a nut and threaded spindle and will hereafter be referred to as such. Means are provided for rotating the spindle 11. This means comprises a worm gear 13 which is rotatably supported in the housing 14 and connected by a worm 15 and gears 16 and 17 to the driving shaft of an electric motor 18 supported on this housing. The spindle 11 is provided with a keyway 19 into which extends a key 20 supported by the worm gear 13. The arrangement is such that the spindle 11 is slidably keyed in the worm gear 13 for rotation about its own axis and the axis of the worm gear.

A gear 21 forming the driving gear of an epicyclic gear train is rotatably supported in the worm gear 13 for a translatory motion about the axis of rotation of the spindle 11. Gears 22 and 23 forming the driven gears of this epicyclic gear train are mounted for rotation about the axis of rotation of the spindle 11. The nut 10 above referred to forms the hub portion of the driven gear 22 and in this respect is connected thereto. All of the gears above referred to are enclosed within the housing 14. The worm gear 13 and driven gears 22 and 23 are separated from one another and from the housing 14 by bearings illustrated in the drawing. The driven gear 22 is partly supported and the driven gear 23 is wholly supported on the hub of the worm gear 13.

Either one or the other of the driven gears 22 or 23 may be stopped by cams 24 or 25, thus effecting a relative rotation of these gears. It is to be noted that the teeth of the driven gears 22 and 23 extend beyond the point of engagement therewith of the driving gear 21. The cams 24 and 25 are supported on a rod 26 so that their end portions may be brought into engagement with the extended teeth of the driven gears 22 and 23. These cams are normally biased out of engagement with the driven gears 22 and 23 by springs 27 and 28 which act against the cams 24 and 25 and the inside surface of the housing 14. The rod 26 is provided at each of its ends with armatures 29 and 30 which extend into operating coils 31 and 32 supported on the outside surface of the housing 14. When either the coils 31 or 32 are energized its corresponding armature 29 or 30 is drawn within the coil against the action of the springs 27 and 28, thus bringing either cam 24 or 25 into engagement with the driven gears 22 or 23.

As illustrated in Fig. 3, energization of the coils 31 and 32 may be placed under the control of a contact making voltmeter 33 whose operating coil 34 is connected across the welding electrodes 12 and 35 which in turn are connected in the welding circuit 36, 37. The work to be welded constitutes the electrode 35. The coils 31 and 32 are energized from a source of supply 38, 39 through contacts 40 and 41 of the voltmeter 33. When contacts 40 are closed, coil 32 is energized and when contacts 41 are closed, coil 31 is energized.

The coils 31 and 32 may be voltage and current coils connected in the welding circuit as illustrated in Fig. 4. In Fig. 4 the electrodes and welding circuit have been designated by the same reference numerals employed in Fig. 3.

The welding apparatus forming the subject matter of my invention is particularly suited for carbon arc welding. In performing carbon arc welding or like welding operations using a non-consuming electrode, it is often desirable to feed fluxing materials or a filler material to the welding arc. Consequently, auxiliary feeding apparatus is usually associated with the welding head for the accomplishment of this purpose. In the apparatus illustrated in Fig. 1, I have illustrated means for driving such auxiliary feeding apparatus. This means comprises a gear 42 mounted on the end portion of the hub of the worm gear 13 which extends through the lower portion of the housing 14 into a support 43 to which the shield 44 and nozzle 45 of the welding apparatus are attached. The gear 42 makes a driving engagement with a gear 46 mounted on an axle 47 which is connected to the auxiliary feeding device not shown in the drawing.

The shield 44 and nozzle 45 may embody the same or a construction like that illustrated in Patent No. 1,963,868, Sally Sandelowsky and Karl Belling, June 19, 1934.

In the construction illustrated in Fig. 1 the nut 10 forms an integral part of a driven gear 22. It is not necessary to make these parts integral. In Fig. 2 a modification has been illustrated in which the nut 10' is detachably secured to the hub portion of the driven gear 22' by means of one or more screws 48.

The apparatus illustrated in Fig. 1 having coils 31 and 32 connected as illustrated in Fig. 3 operates as follows: At the beginning of the welding operation when the electrode 12 is separated from the work 35, the full voltage of the welding circuit is impressed across the electrodes and, consequently, across the operating coil 34 of the voltmeter 33. This causes the voltmeter to close its contacts 41 thus connecting coil 31 to the source of supply 38, 39. The energization of the coil 31 attracts its armature 29 and places cam 24 in engagement with driven gear 22. As is apparent from the above description the driven gears 22 and 23 as well as the worm gear 13 and the spindle 11 supported therein at the beginning of the welding operation are in continual rotation by reason of their connection to the motor 18, which is set in operation before initiating the welding operation. By stopping the rotation of the driven gear 22 the spindle 11, which is threaded in the nut portion 10 thereof, is fed toward the work 35 eventually bringing the electrode 12 into engagement therewith. As soon as the electrode 12 touches the work, the operating coil 34 of the voltmeter 33 is deenergized, permitting the opening of its contacts 40, deenergizing coil 31 and the closure of its contacts 40 energizing coil 32 by connecting it to the source of supply 38 and 39. The energization of coil 32 attracts its armature 30 and moves cam 24 out of engagement with driven gear 22 and cam 25 into engagement with driven gear 23, thus stopping the rotation of this gear. When the rotation of this gear is stopped the driven gear 22 is caused to rotate in the same direction as the spindle 11 but at twice its speed, due to the action of the driving gear 21. This causes the spindle 11 to be moved from the work which in turn moves the electrode from the work to strike the arc. After an arc of predetermined length has thus been established, the voltmeter 33 opens both its contacts 40 and 41. If the arc length tends to increase, due to the consumption of the welding electrode for example, the voltmeter 33 will again close its contacts 41 causing the mechanism embodying the epicyclic gear train to again feed the electrode toward the work. On the other hand, if the arc length becomes too small, the voltmeter 33 will close its contacts 40, thus causing the epicyclic gear train to withdraw the electrode from the work.

When the coils 31 and 32 are connected as shown in Fig. 4, the voltage across the arc and the current flow through the arc will energize these coils to obtain an operation like that above described in connection with Fig. 3.

The combination of an epicyclic gear train with internally and externally threaded screw members greatly simplifies a welding head adapted for rotating an electrode and, at the same time, feeding it toward and away from the work to strike and thereafter maintain a welding arc of desired characteristics. The arrangement also permits the use of electromagnetic means of simplified and compact construction for operating the device.

It is apparent that the arrangement illustrated may be variously modified without departing from the spirit and scope of my invention. Thus, for example, the epicyclic gear train may be made up of pinions instead of bevel gears as illustrated, and more than one driving gear may be used. Furthermore, the particular arrangement for arresting the rotation of driven gears 22 and 23 may be any suitable braking device other than that illustrated.

What I claim as new and desire to secure by Letters Patent of the United States is:

1. Apparatus comprising an internal screw and an external screw, one of which is threaded on the other, means for rotating one of said screws, an epicyclic gear train having two driven gears mounted for rotation about the axes of rotation of said screws and a driving gear rotatably supported by said rotating means for a translatory motion about the axes of rotation of said screws, means for connecting one of said driven gears to the other of said screws, and means for effecting relative rotation of said driven gears.

2. Apparatus comprising an externally threaded spindle, a nut threaded on said spindle, rotating means for imparting rotation to said spindle, an auxiliary device driven by said rotating means, a gear forming the driving element of an epicyclic gear train rotatably supported in said rotating means for a translatory motion about the axis of rotation of said spindle, two gears forming the driven elements of said epicyclic gear train mounted for rotation about the axis of rotation of said spindle, means for connecting one of said driven gears to said nut, means for engaging one or the other of said driven gears for effecting relative rotation of said gears, and means for operating said last mentioned means.

3. Apparatus comprising an internal screw and an external screw, one of which is threaded on the other, means for rotating one of said screws, an epicyclic gear train comprising a driving gear and two driven gears having teeth extending beyond the point of engagement therewith of said driving gear, means for rotatably supporting said driving gear on said rotating means for a translatory motion about the axes of rotation of said screws, means for supporting said driven gears for rotation about the axes of rotation of said screws, means for connecting one of said driven gears to the other of said screws, means for engaging the extended teeth of said driven gears, and means for operating said last mentioned means and effecting relative rotation of said driven gears.

EBERHARD RIETSCH.